United States Patent [19]

Busch et al.

[11] Patent Number: 5,538,473
[45] Date of Patent: Jul. 23, 1996

[54] CONSTANT VELOCITY UNIVERSAL JOINT

[75] Inventors: Winfried Busch, Köln; Eugen Stall, Neunkirchen, both of Germany

[73] Assignee: GKN Automotive AG, Lohmar, Germany

[21] Appl. No.: 153,417

[22] Filed: Nov. 15, 1993

[30] Foreign Application Priority Data

Dec. 8, 1992 [DE] Germany ............ 42 41 275.7
Sep. 15, 1993 [DE] Germany ............ 43 31 108.3

[51] Int. Cl.$^6$ ............................................. F16D 3/205
[52] U.S. Cl. .................. 464/111; 464/123; 464/905; F16D/3/205
[58] Field of Search ..................... 464/111, 120, 464/122, 123, 905

[56] References Cited

U.S. PATENT DOCUMENTS

| | | | |
|---|---|---|---|
| 4,773,890 | 9/1988 | Iwasaki et al. | 464/111 |
| 4,810,232 | 3/1989 | Farrell et al. | |
| 4,854,917 | 8/1989 | Mizukoshi | 464/111 |
| 4,891,035 | 1/1990 | Sasaki et al. | 464/111 |
| 4,988,327 | 1/1991 | Orain | 464/111 |
| 5,069,653 | 12/1991 | Mizukoshi | 464/123 X |
| 5,137,496 | 8/1992 | Sasaki et al. | 464/111 |
| 5,256,107 | 10/1993 | Matsumoto et al. | 464/111 |

FOREIGN PATENT DOCUMENTS

| | | | |
|---|---|---|---|
| 2107459 | 8/1972 | Germany . | |
| 2343715 | 3/1975 | Germany . | |
| 2117088 | 12/1985 | United Kingdom . | |
| 2226102 | 6/1990 | United Kingdom | 464/111 |
| 2252144 | 7/1992 | United Kingdom | 464/111 |

Primary Examiner—Daniel P. Stodola
Assistant Examiner—Eileen A. Dunn
Attorney, Agent, or Firm—Harness, Dickey & Pierce

[57] ABSTRACT

The area pressure in a constant velocity universal joint of the tripode type is reduced to improve the lubrication conditions. The ends of the arms of the inner joint part facing the two directions of rotation of the joint arms are each provided with a face extending parallel to the longitudinal axis of the joint and to the axis of the respective arm. The inner is produced by a forming tool divided into two parts. The workpiece is journal-shaped and when shown in an axial section, comprises a convexly curved outer circumference. The pressing and/or forging burr is formed in such a way that the use of the workpiece is not adversely affected and therefore subsequent machining of the burr is not required. In the region of the burr, there is the face as a result of which the burr, relative to the outer contour, is displaced radially inwardly. A further embodiment of the invention has a spherically shaped outer face of the outer roller which is provided with a concentrically arranged, rotating, cylindrically shaped face, with the center plane of the outer roller extending perpendicularly relative to the axis of the arms and at the same time constituting the center plane of the face.

8 Claims, 4 Drawing Sheets

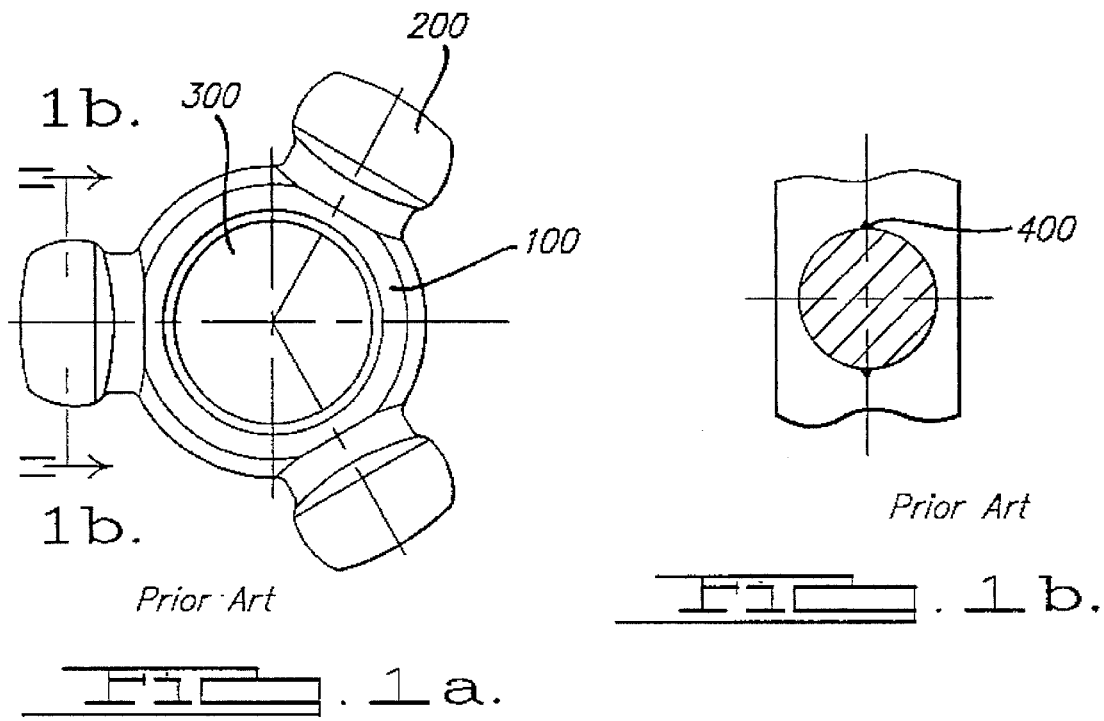
FIG. 1a. *Prior Art*
FIG. 1b. *Prior Art*
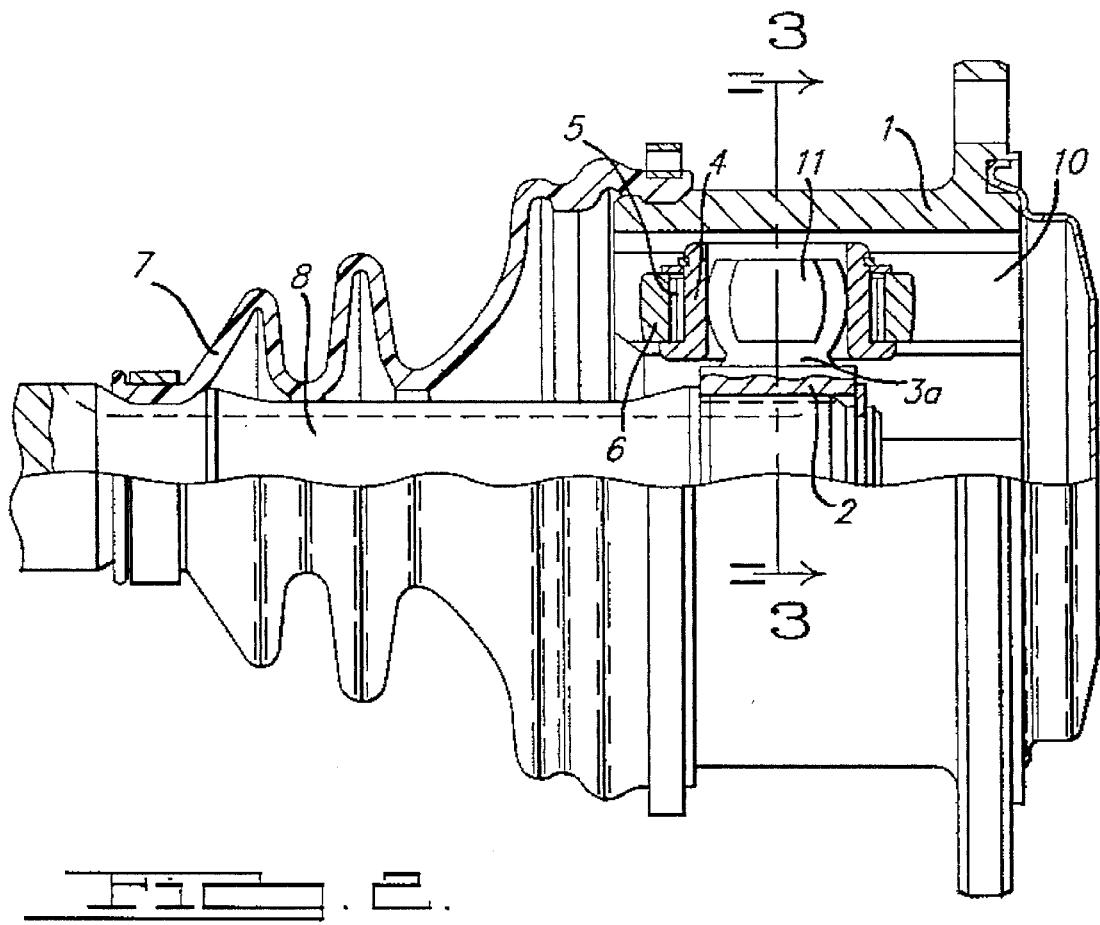
FIG. 2.

CONSTANT VELOCITY UNIVERSAL JOINT

FIELD OF THE INVENTION

The present invention relates to a constant velocity universal joint of the tripode type having an outer joint part provided with three circumferentially distributed, axially extending, axis-parallel guiding grooves with two guiding tracks associated with each of the guiding grooves. The tripode joint further includes an inner joint part provided with arms which correspond to the guiding tracks and which extend radially with reference to the joint axis. A roller assembly is arranged on each arm and consists of an inner roller and an outer roller supported on the inner roller by means of a plurality of needle bearings. The present invention further relates to a workpiece of the constant velocity universal joint which is produced by forming using a two-part forming tool. The workpiece is journal-shaped, which, when shown in an axial section, comprises a convexly curved outer circumference and which comprises an axially extending burr resulting from the joint of the forming tool.

BACKGROUND AND SUMMARY OF THE INVENTION

It has already been proposed, in the case of Hook's joints, to provide the arms of the cross member with grooves by subjecting the arms to a roughing operation while being turned to permit the storage of grease in the grooves (GB-A 2117088).

The disadvantage of the above proposal consists in that in view of the line contact existing between the arms and the needles of a needle bearing arranged thereon, a defined surface is not available. The load is applied via an interrupted line contact, and the area pressure fluctuates as a function of the distribution of the grooves.

It is also known to press or forge a workpiece by means of a two-part tool (DE-OS 2 107 459). To avoid any pressing or forging burr, the above publication proposes to measure the amount of material in such a way that no forging or pressing burr occurs during production. However, the disadvantage of this proposal is that it is not possible to measure the material that accurately so that either some pressing or forging burr occurs, even if it is just a very small amount, or the die is not completely filled so that in the final analysis the workpiece does not have the required shape.

It is the object of the present invention to design the arms of a constant velocity universal joint of the tripode type in such a way as to improve the distribution of area pressure under torque loads and, furthermore, to provide a free space for storing grease.

It is a further object of the present invention to design a journal-shaped workpiece with a convexly curved outer circumference in such a way that any pressing or forging burr is located in a position which does not adversely affect the subsequent use of the workpiece and that there is no need for subsequent machining.

In accordance with the invention, one objective is achieved in that, at their ends facing the two directions of rotation of the joint, the arms are each provided with a generally flat face which extends parallel to the longitudinal axis of the joint and to the axis of the respective arms.

By providing this face, the circumferential force depending on the torque transmitted is divided into two equal force components. As a result, the area pressure values are reduced.

At the same time, the free space formed by this face and the enveloping cylinder associated with the arm serves as a storage space for lubricating grease.

In addition, this measure reduces the noise of the joint.

In accordance with the present invention, a further objective is achieved in that on both sides, the region of the burr of the arms is located on this generally flat face where the outer contour is pulled radially inwardly, with the flat portions being formed in the respective locations.

The design in accordance with the present invention is advantageous in that bearing rings may be positioned on the journal-shaped workpiece without there being any need for any subsequent machining.

In an advantageous embodiment of the present invention it is proposed that in the case of an inner joint part of a tripode joint produced by forming and comprising radially outwardly pointing tripode arms serving to receive rollers, the flat portions are provided at the tripode arms.

In this way, any subsequent machining of the inner joint part carrying the tripode arms is avoided.

In the case of a process of forming a workpiece which is produced by a two-part forming tool, which is journal-shaped and which, when shown in an axial section, comprises a convexly curved outer circumference, the flat portions are provided at the journal-shaped workpiece during the forming operation as a result of the two-part forming tool being shaped accordingly.

In this way it is possible to provide the flat portions in a simple and cost-effective way.

According to one embodiment of the invention, the faces are provided on cylindrically shaped arms.

According to a further feature of the invention, the faces are provided on spherically shaped arms.

The arms of tripode joints are normally either cylindrical or spherical.

Both types benefit from the advantages of the invention.

According to an advantageous embodiment of the invention it is proposed that in the case of a joint with part-cylindrical guiding tracks, the spherically shaped outer face of the outer roller is provided with a concentrically arranged, rotating, cylindrically shaped face and that the center plane of the outer roller extending perpendicularly relative to the axis of the arm at the same time constitutes the center plane of the face.

Additionally, with this embodiment, the fact that the outer roller of the roller assembly is supported in the guiding grooves of the outer joint part is utilized to split the circumferential force into two force components.

According to an advantageous feature of the invention, it is proposed that, in the case of a joint whose inner roller is provided with a spherical inner wall, the inner roller may be guided over the spherical arm as a result of an elastic, radially inwardly directed deformation caused by said roller being loaded by a force F extending perpendicularly to the faces.

In addition to the advantages already mentioned, this embodiment is advantageous in that an inner roller with a spherical inner wall can easily be mounted on a spherical arm without causing an design-related additional expenditure.

In an advantageous embodiment of the present invention, the journal-shaped workpieces are produced by forging.

In a further advantageous embodiment of the present invention, the journal-shaped workpieces are produced by pressing.

In an advantageous application of the process, the flat portions are provided at the arms of the inner joint part.

According to a further feature of the process, the flat portions are provided at an outer roller for the purpose of guiding the arms of an inner joint part.

This design makes it possible to produce the inner part of a tripode joint in a simple and cost-effective way.

BRIEF DESCRIPTION OF THE DRAWINGS

Below, the invention will be explained in greater detail with reference to some embodiments illustrated in the drawings wherein:

FIG. 1a shows an inner part of a prior art constant velocity tripode joint having spherical tripode arms;

FIG. 1b is a section through the spherical tripode arm in the direction of arrows 1b—1b of FIG. 1a;

FIG. 2 is a longitudinal section through a constant velocity universal joint of the tripode type with spherical arms;

DETAILED DESCRIPTION OF THE PREFERRED EMBODIMENT

Figure 3:
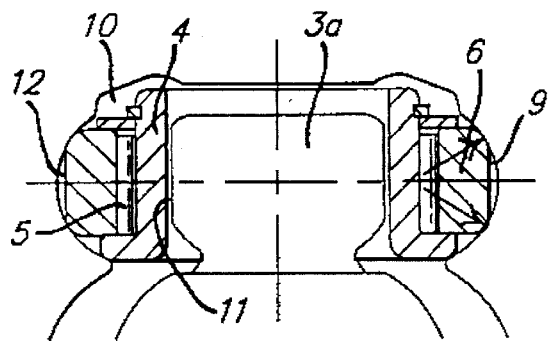
FIG. 3 is a partial cross-section through a constant velocity universal joint with spherical arms, the outer roller being designed in accordance with the invention, the cross-section being taken in the direction of arrows 3—3 of FIG. 2.

FIG. 1a shows a prior art inner joint part of a constant velocity tripode joint 100, which is provided with spherical tripode arms 200. In the center of the inner joint part 100 there is provided a bore 300 which serves to receive a shaft for transmitting the torque.

FIG. 1b shows that the burr 400 has to be removed by machining to be able to receive an internally cylindrical part.

The constant velocity universal joint illustrated in FIG. 2 consists of an outer joint part 1 which, by means of tripode arms 3a, 3b engaging its guiding grooves 10 is in torque connection with an inner joint part 2.

A shaft 8 connectable to a drive output end (not illustrated) is inserted into the inner joint part 2. As a rule, the constant velocity universal joint is filled with grease, and a boot 7 serving to seal the joint and at the same time to prevent the penetration of dirt is attached to the outer joint part 1 and to the shaft 8.

The roller assembly arranged on the arms 3a consists of an inner roller 4 guided on the arm, a plurality of needle bearings 5 and an outer roller 6.

Figure 4:
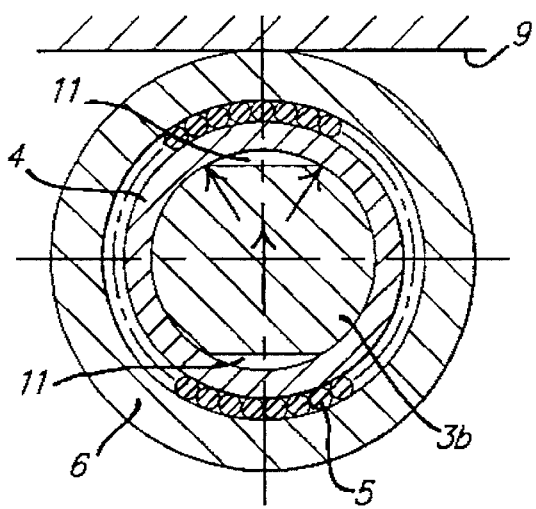
FIG. 4 is a cross-section through a cylindrical arm, showing the roller assembly and the circumferential force divided into two force components acting from the arm on to the inner roller.

At its end facing the circumference, the spherical tripode arm 3a illustrated in FIG. 2 is provided with a face 11. As can be seen in FIG. 4, the face 11 causes the circumferential force at the spherical tripode arm 3a to be divided into two force components.

FIG. 3 also shows the outer roller with a rotating face 12 so that in this case, too, the circumferential force introduced into the outer joint part 1 by the guiding tracks 9 is split into two force components.

Figure 3A:
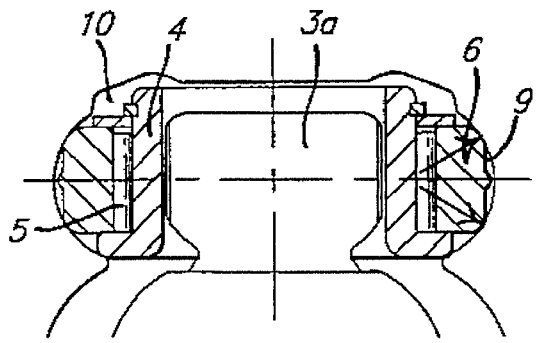
FIG. 3a is a view similar to FIG. 2 but showing the outer roller incorporating the forming burr.

FIG. 3a shows an outer roller 6 provided with a rotating face 12 having a forming burr being received in a guiding track 9.

FIG. 4 shows the face 11 as provided at a cylindrical tripode arm 3b. At the same time, FIG. 4 indicates that the circumferential force is again divided into two force components.

Figure 4A:
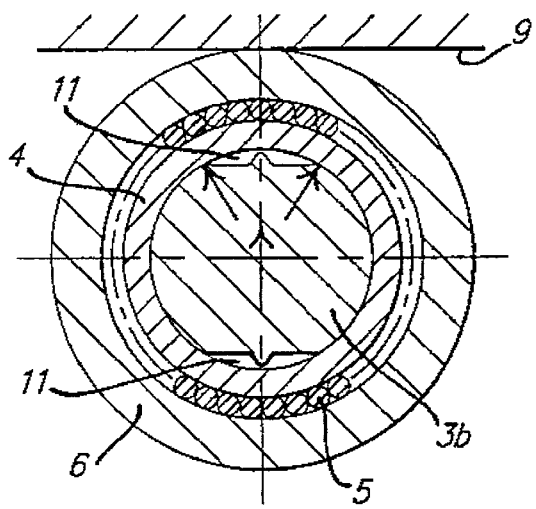
FIG. 4a is a view similar to FIG. 4 but showing the arm of the roller assembly incorporating the forming burr.

FIG. 4a shows a cylindrical tripode arm which, as is commonly the case with tripode joints, receives an inner roller 4, a plurality of needle bearings 5 and an outer roller 6. FIG. 4a shows how the cylindrical tripode arm 3b is supported, in respect of forces shown by the arrows in FIG. 4a, within the inner roller 4. As a result of the face 11, there are identifiable two supporting regions which help to distribute the surface pressure more uniformly.

At the same time it is advantageous that grease or other lubricants can be stored on a long-term basis in the region of the face 11 as a result of which the lubrication conditions are improved.

Figure 5:
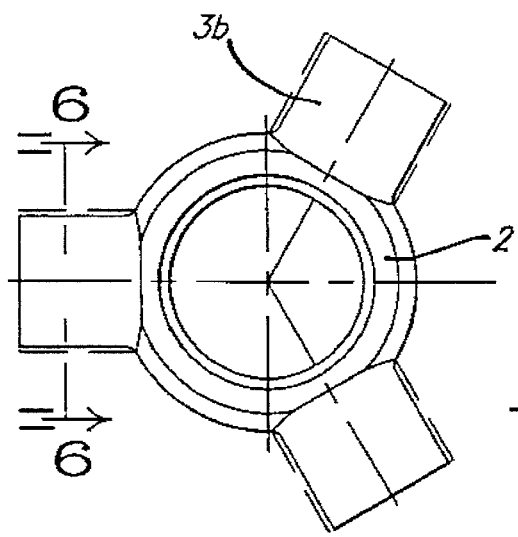
FIG. 5 is a plan view of an inner joint part with cylindrical arms.

FIG. 5 contains a plan view of an inner joint part 2 with cylindrical tripode arms 3b.

Figure 6:
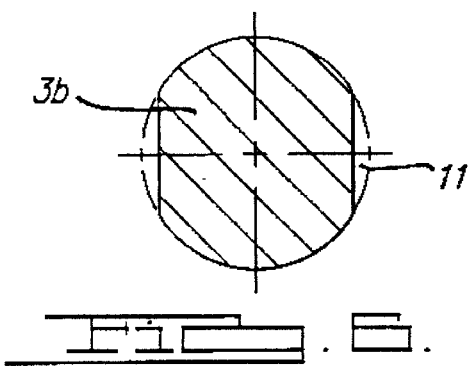
FIG. 6 is a partial section 6—6 according to FIG. 5.

FIG. 6 illustrates the design principle of a cylindrical arm 3b illustrated in section.

Figure 6A:
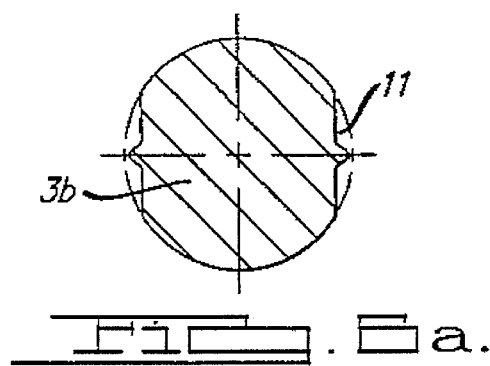
FIG. 6a is a view similar to FIG. 6 but showing the arm of the tripode incorporating a forming burr.

FIG. 6a shows that the burr 400 is positioned in the region of the outer enveloping circle of the cylindrical tripode arm 3b.

Figure 7:
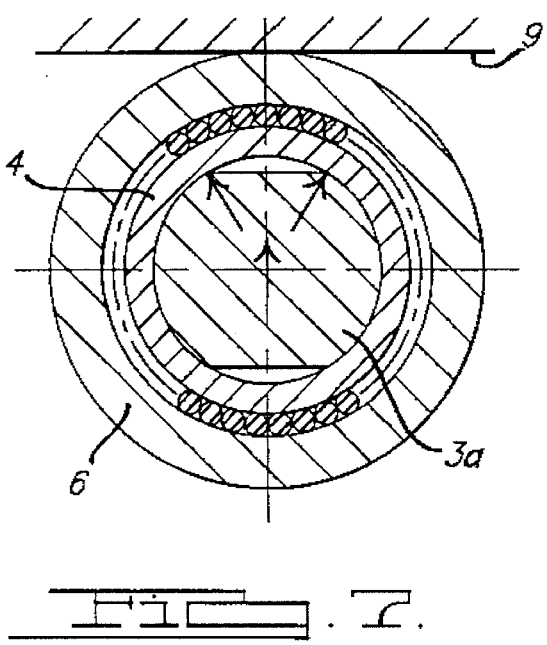
FIG. 7 shows the division of forces with reference to a spherical arm.

FIG. 7 is a section through a spherical tripode arm 3a, also showing the division of forces.

Figure 7A:
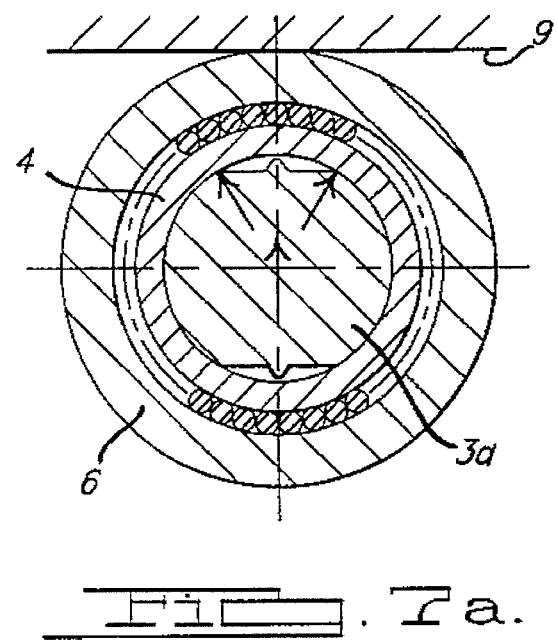
FIG. 7a is a view similar to FIG. 7 but showing the arm of the tripode incorporating a forming burr.

FIG. 7a also shows the distribution of forces with the tripode arm 3a being unilaterally supported via a roller bearing and including the forming burr.

Figure 8:
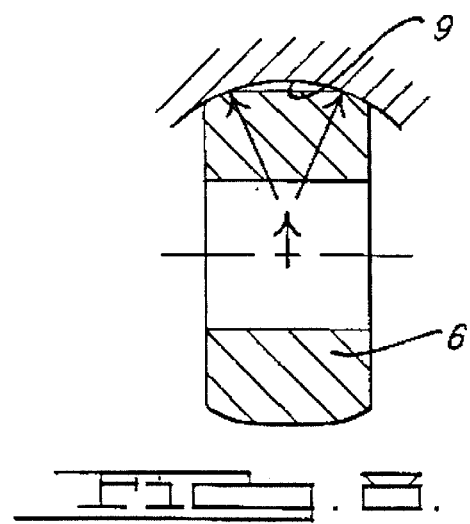
FIG. 8 shows the principle of dividing the force with reference to the outer roller and the effect of the force on the guiding track.

FIG. 8 shows the division of the circumferential force into two force components with reference to the outer roller 6 guided in a guiding track 9 and their effect on the guiding track 9.

Figure 8A:
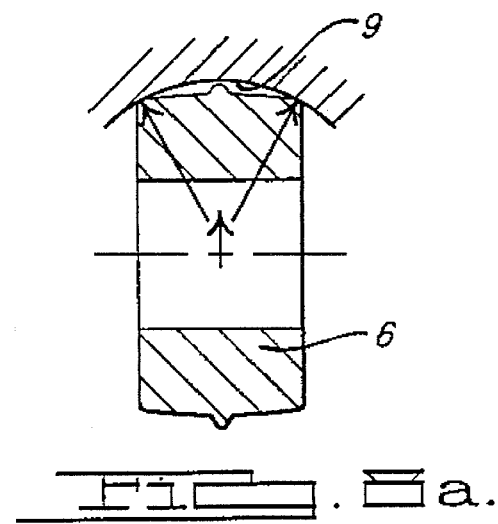
FIG. 8a is a view similar to FIG. 8 but showing the outer roller incorporating a forming burr.

FIG. 8a illustrates an outer roller 6 which was also produced by pressing or forging in accordance with the present invention. In the case of the outer roller 6, the burr is continuous, i.e. the outer roller 6 is provided with a continuously extending face. The outer roller is supported in a circular guiding track 9 of a tripode joint.

Figure 9:
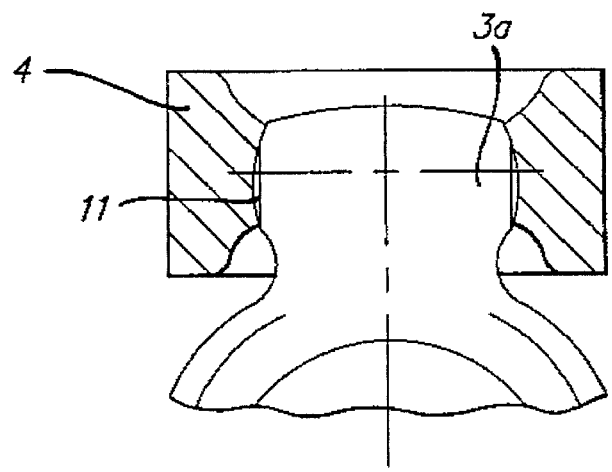
FIG. 9 is a partial section through a tripode with spherical arms and a spherical inner roller provided at its inner face.

FIG. 9 shows a spherical tripode arm 3a in connection with an inner roller 4 comprising a spherical inner wall.

This embodiment has an additional advantage in that the outer roller, through elastic deformation caused by a force F acting perpendicularly relative to the face 11, may be slid over the spherical tripode arm 3a.

Figure 10:
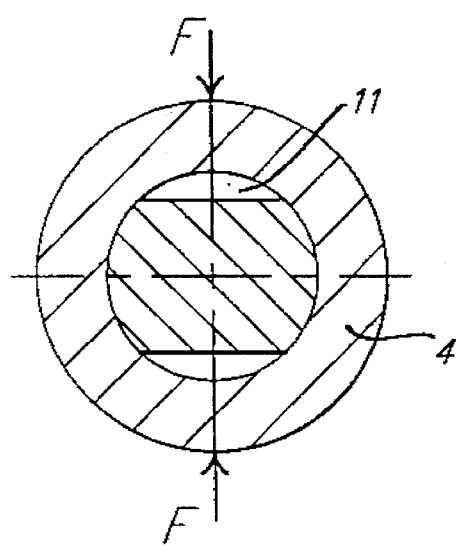
FIG. 10 is a plan view of the illustration according to FIG. 9.

FIG. 10 shows the direction of the force F. In the case of this embodiment it is possible for the inner roller 4 to be mounted in a simple and cost-effective way on the spherical arm 3a where it is restrained.

Figure 10A:
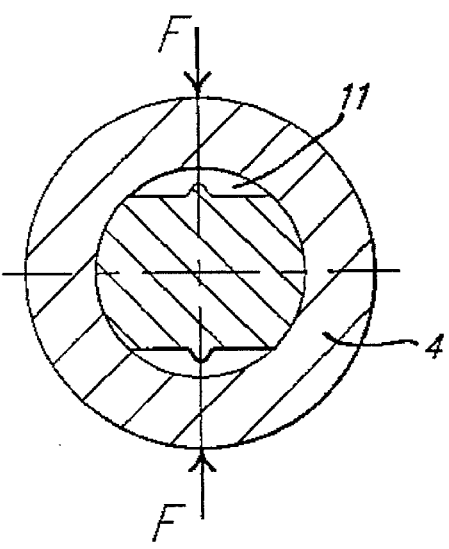
FIG. 10a is a view similar to FIG. 10 but showing the tripode with spherical arms incorporating a forming burr.

FIG. 10a shows the direction of the force F. In the case of this embodiment the inner roller 4 includes the forming burr.

While the above detailed description describes the preferred embodiment of the present invention, it should be understood that the present invention is susceptible to modification, variation and alteration without deviating from the scope and fair meaning of the subjoined claims.

What is claimed is:

1. A tripode constant velocity joint comprising:

an outer joint member defining a first joint axis and having three circumferentially distributed axial extending, axis-parallel guiding grooves, each of said guiding grooves having a pair of guiding tracks;

an inner joint member defining a second joint axis having three arms which correspond to said three guiding grooves, each arm defining an arm axis and extending radially with respect to said second joint axis and having a pair of generally flat faces, each of said flat faces defining a plane which extends generally parallel to said second joint axis and generally parallel to said arm axis; and a roller assembly arranged on each arm, said roller assembly having an assembly axis and including an inner roller, an outer roller and a plurality of needle bearings disposed between said inner and outer rollers.

2. The tripode constant velocity joint according to claim 1 wherein said arms are partially cylindrical.

3. The tripode constant velocity joint according to claim 1 wherein said arms are partially spherical.

4. The tripode constant velocity joint according to claim 3 wherein said inner roller includes a partially spherical inner wall.

5. The tripode constant velocity joint according to claim 1 wherein each of said outer rollers defines a center roller plane and includes a cylindrical shaped outer face, said center roller plane extending generally perpendicular to said assembly axis, and said cylindrical outer face extending coaxially to said assembly axis and including said center roller plane.

6. The tripode constant velocity joint according to claim 1 wherein said inner roller includes a partially spherical inner wall.

7. The tripode constant velocity joint according to claim 1 wherein at least one of said faces includes a burr, said burr accommodating the excess material from the forming of said inner joint member.

8. The tripods constant velocity joint according to claim 1 wherein said outer roller includes a burr in said center roller plane, said burr accommodating the excess material from the forming of said outer roller.

* * * * *